S. B. BROWN.
CAN CASTER.
APPLICATION FILED NOV. 10, 1913.
1,130,684.
Patented Mar. 2, 1915.
2 SHEETS—SHEET 1.
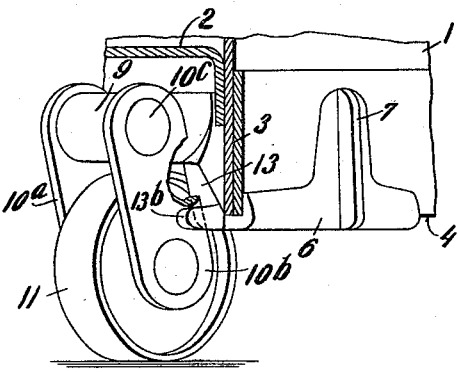
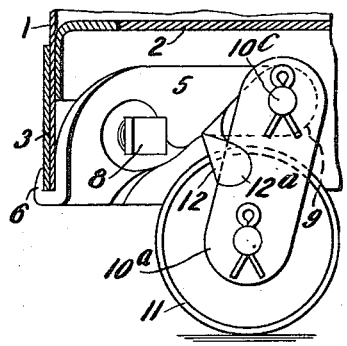
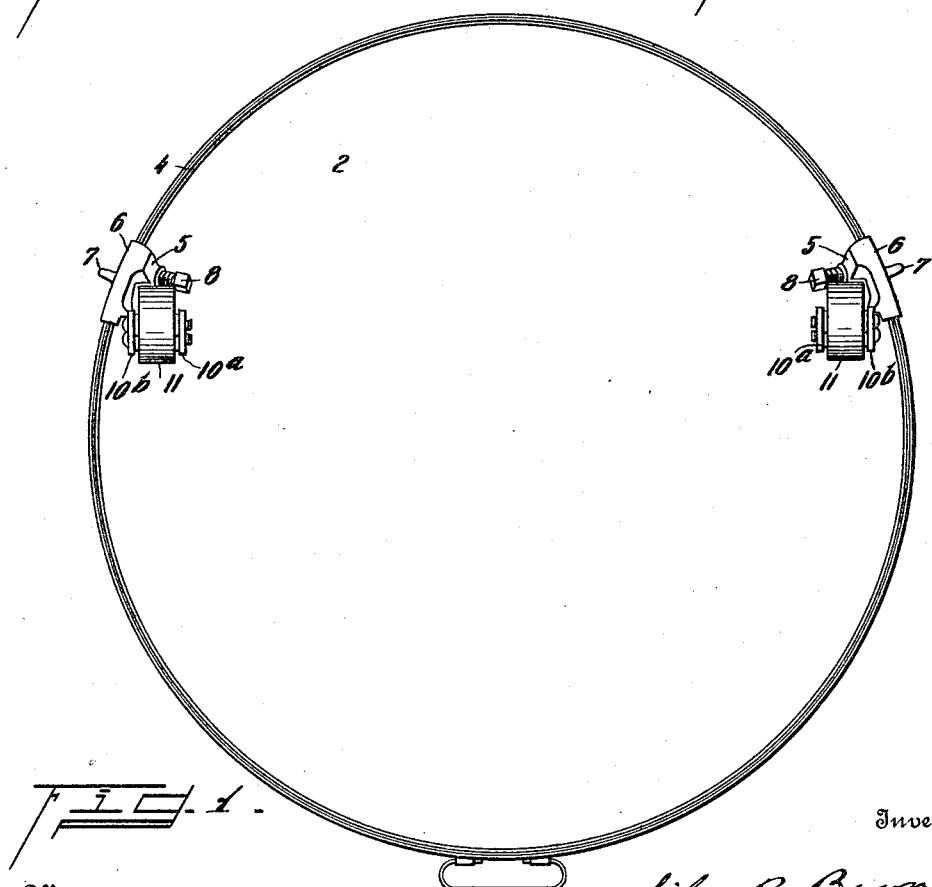

S. B. BROWN.
CAN CASTER.
APPLICATION FILED NOV. 10, 1913.
1,130,684.   Patented Mar. 2, 1915.
2 SHEETS—SHEET 2.
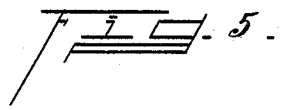
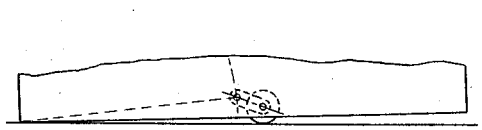
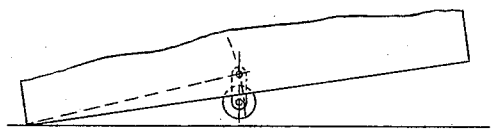
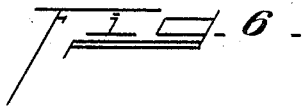
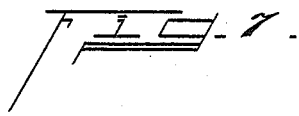
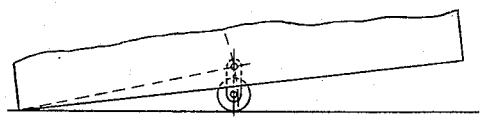
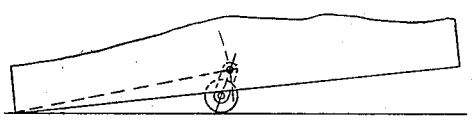
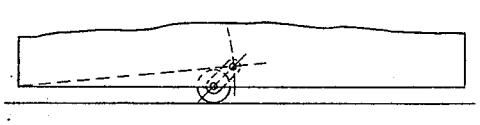
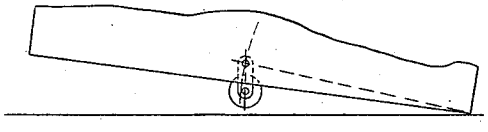
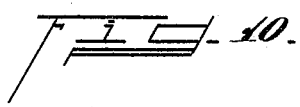
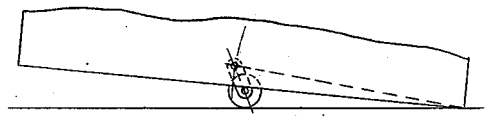
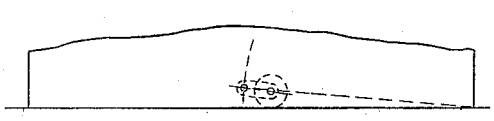
Inventor
Silas B. Brown
By Wood, Wood & Nathan
Attorneys
Witnesses

UNITED STATES PATENT OFFICE.

SILAS B. BROWN, OF CINCINNATI, OHIO, ASSIGNOR TO THE ROCKAWAY MANUFACTURING COMPANY, A PARTNERSHIP CONSISTING OF E. W. EDWARDS AND S. B. BROWN, OF CINCINNATI, OHIO.

CAN-CASTER.

1,130,684.        Specification of Letters Patent.        Patented Mar. 2, 1915.

Application filed November 10, 1913. Serial No. 800,017.

*To all whom it may concern:*

Be it known that I, SILAS B. BROWN, a citizen of the United States, residing at Cincinnati, in the county of Hamilton and State of Ohio, have invented certain new and useful Improvements in Can-Casters, of which the following is a specification.

My invention relates to a new truck mechanism.

The object of the invention is to provide a body to be wheeled, with means controlled by the manipulation of said body, enabling it to become converted into a truck or a non-wheel supported device as desired.

A very useful embodiment of the invention is disclosed in the drawings, wherein the body to be trucked may be assumed to be a refuse vessel, such as the conventional ash or garbage sheet metal can or barrel.

The features of the invention are more fully set forth in connection with the description of the accompanying drawings forming a part of this specification and representing said specific embodiment of the inventive principle.

Figure 1 is a bottom plan view of the base of such a vessel with the trucking mechanism applied. Fig. 2 is a side elevation partly in section of one of the trucking brackets and rollers, secured to the annular base flange of a vessel. Fig. 3 is a similar view showing the other side of the bracket. Fig. 4 is a diagrammatic view of an article to be wheeled in the initial tilting position for converting it into a truck, with the roller resting on the floor, the holder being free to swing on its pivot under gravity influence. Fig. 5 shows the relative positions of body, roller holder and roller at a further stage of tilting, the roller being lifted from the floor. Fig. 6 shows a third stage of tilting, the raised end of the body having been lowered so that the roller touches the floor. Fig. 7 shows the further lowering of the raised end of the body, showing position roller assumes in final approach to trucking position. Fig. 8 shows the completed trucking position, the entire body now being supported on the roller. Fig. 9 shows the first stage of the restoring movement, with the other end of the body reversely tilted to clear the roller from the floor. Fig. 10 shows a further stage of the restoring movement, with the tilted end of the body lowered until the roller touches the floor, the holder being inclined toward its normal (non-functional) position shown in Fig. 4. Fig. 11 shows the completion of the restoring movement, with the body resting entirely on the floor, and the roller in non-trucking position.

The body 1, selected for clear disclosure of a preferred embodiment of the invention, is circumferential in cross section, the bottom 2 of the vessel being positioned above the bottom edge of the wall 3, so that the body movably rests on its bottom wall edge 4, constituting a non-wheel supported structure. The interior space defined by the bottom of the body and downwardly projecting wall, is available as a housing for the truck mechanism. The trucking mechanism for connection to the base of a body to be wheeled comprises a bracket 5, and in this instance, as the body is circumferential in cross section, the engaging edge of the bracket corresponds in configuration to a segment of the body wall circumference. The lower portion of the bracket has an outwardly extending channel flange 6, with an upwardly projecting clamping post 7, the base rim of the body wall being positioned between said post and the bracket proper, through which the bolt 8 projects for securing the bracket to the body, the roller supporting portion of the bracket being thus disposed interiorly relative to the base housing portion of the body. The upper portion of the interior portion of the bracket has a laterally projecting pivot lug or sleeve 9, in which is pivotally supported a roller holder or hanger 10 comprising the limb members $10^a$, $10^b$, the pivot bolt $10^c$ extending through said sleeve 9, and the upper ends of said limbs. A roller 11 has a bearing in the lower end of said swinging, depending strap between said limbs, so that as the hanger swings in its arc, as by raising or lowering the bracket, the roller may be relatively moved from a position above the channel flange 6, (a non-wheel supporting position on the body), to a position below said channel flange constituting a truck conversion of the body, or restored to normal, non-wheel supporting position within the body housing. I preferably form the bracket with a depending stop lug 12, to engage the hanger member $10^a$ to limit its swing and its movement to one side of a vertical line when the tilted end of the body is appropriately lowered, said lug having a lateral extension 12ª to brace said hanger against torsional strains in one direction, as shown in Fig. 3. In like manner I provide on the other side of the bracket a stop lug 13, for limb member 10ᵇ, having a lateral extension 13ᵇ, to brace the stop against lateral strains in the other direction, see Fig. 2. These bracket stop lugs limit the arc of movement of the hanger as it swings to trucking position when the body is appropriately tilted and the weight shifted to urge said hanger in the direction of said lugs.

Preferably I provide two of the truck devices, as shown in Fig. 1, for lateral stability, and it is obvious that their normal position of non-wheel support is wholly within the body housing, as the body stands on the floor or ground, while their truck-converted position is with the rollers below the bottom edge of the body wall, the hangers being held by the weight of the body against the stop lugs, to one side of the vertical line, in which position the body is manually balanced on and supported by said rollers for wheeling.

The principle of the invention involved, of course, resides in the use of either a single or a plurality of such truck devices, and for the purposes of disclosure it may be assumed that a selected body is provided with a single bracket and roller disposed in a line coincident with the selected balance point of the body.

The roller must have a permissive position above or below the ground line of the body as the body is appropriately manipulated and the load shifted. In normal position, Fig. 11, the roller is above or coincident with the ground line, the bracket hanger being free to move upwardly so that the roller supports no part of the load, and is preferably concealed within an interior, body base housing, in which position the body rests wholly on the floor or ground. The hanger is free to swing downwardly and from right to left when the body is tilted upwardly on its left end as the ground pivot, the radius and arc of this body movement being indicated by dotted lines, Fig. 4. As the right side of the body is slightly raised the hanger swings on its pivot, the roller resting on the floor, until this end of the body is raised sufficiently to permit the hanger to fall into vertical line with the roller clearing the floor, as shown in Fig. 5. The right side of the body is then slightly lowered, the body still tilting or pivoting on its left side ground line, until the roller touches the ground with the hanger in vertical position, (see Fig. 6); as the raised side of the body is still further lowered, the hanger moves to the left of the vertical line under the influence of the body weight now imposed on the roller, and the direction of the tilting movement of the body, (see Fig. 7), until the hanger is arrested by the stop lugs, when the further lowering of the right side of the body shifts the balance, and raises the pivotal end of the body from the floor, the body being now supported by the roller while the operator holds the right side of the body raised, the load being balanced on the roller and the body converted into a truck (see Fig. 8). To restore the body to a non-truck device, the left side of the body is raised so that the body tilts or floor-pivots on the right side, and the roller is raised from the floor, the hanger swinging from left to right into vertical position shown in Fig. 9, then as the left end of the body is lowered, the hanger under the influence of gravity and the direction of body pivotal movement, is moved to the right by the floor contact of the roller (see Fig. 10), until the left side of the body is lowered to the floor line, the hanger moving to the right in its arc path to the non-functional position, Fig. 11, the weight of the body resting entirely on the floor or ground. Preferably the fixed pivotal point of the roller hanger on the body is slightly to one side of the center of gravity, or balance point of the load, to give a wheelbarrow effect.

The hanger will always move from vertical line toward the ground fulcrum point of the body, as the other end is lowered, and it follows that the roller can be moved to trucking position or to non-trucking position as the body is appropriately tilted and the weight shifted.

It is obvious that this inventive principle is susceptible of a variety of embodiments for the purpose disclosed, and the claims are not to be limited to the preferred form, except where it is specifically defined.

It is of course necessary that the pivoted roller hanger or holder be so positioned relative to the body base, as to enable the body to be ground-tilted on the base, upon either side of the pivot point of said hanger, and further that there be some means determining the trucking position of the hanger which will automatically function as the body is tilted on one side of the hanger pivot point, and means enabling the hanger to swing above the ground line of the base, as the body is reversely ground-tilted to render the roller inoperative as a body support.

Having described my invention I claim:—

1. In a device of the nature disclosed, a body to be trucked and untrucked, a roller holding member pivotally suspended from a portion of the body base, shiftable under the influence of gravity, enabling the body to be ground-tilted on either side of said member, whereby said member may be moved to either side of a vertical line, and means limiting its movement to one side of the vertical line defining the truck position of the roller.

2. In a device of the nature disclosed, a body, a roller holding member pivotally suspended from a portion of the body base, shiftable under the influence of gravity, enabling the body to be ground-tilted on either side of said member, and means limiting the movement of said member in one direction.

3. A trucking device for a body comprising an attaching bracket, a roller holding member pivotally suspended therefrom and free to swing under the influence of gravity, means on the bracket limiting the movement of said member in one direction, and means on the bracket bracing the member against torsional strains.

4. In a device of the nature disclosed, a body, a roller holding member pivotally suspended from a portion of the body base enabling said body to be ground-tilted on either side of said member, the roller being movable in the arc of a circle from a position above the ground-line of the body base, where the roller is upon one side of the vertical line of the pivot point of the holder, to a position below the ground-line of the body base where the roller is on the other side of said vertical line, when the body is ground tilted on one end, and returnable to normal position when the body is reversely tilted, and means limiting the movement of said member to determine its trucking position.

5. In a device of the nature disclosed, a body having a base formed with a housing above the ground line, a roller holding member pivotally suspended from the base and movable into and out of said housing, and means operated by tilting the body on its base rendering said body selectively roller-supported or base-supported.

6. In a device of the nature disclosed, a body having a base formed with a housing above the ground line, a roller holding member pivotally suspended from the base enabling the body to be ground-tilted on either side of said member, the roller being movable to and from said housing, and means operated by the body-tilting to render said body selectively roller-supported or non-roller-supported.

7. In a device of the nature disclosed, a bracket having provision for attachment to the base portion of a body, at a base portion thereof, enabling said body to be ground-tilted on either side of said point of bracket attachment, a roller holding hanger pivoted to said bracket and free to swing under the influence of gravity, and means limiting the hanger movement in one direction, determining the position of roller support for the body.

In testimony whereof, I have hereunto set my hand.

SILAS B. BROWN.

Witnesses:
OLIVER B. KAISER,
LOUISE A. BECK.

Copies of this patent may be obtained for five cents each, by addressing the "Commissioner of Patents, Washington, D. C."